(12) United States Patent
Yamasaki

(10) Patent No.: US 9,667,961 B2
(45) Date of Patent: May 30, 2017

(54) VIDEO ENCODING AND DECODING APPARATUS, METHOD, AND SYSTEM

(71) Applicant: Oki Electric Industry Co., Ltd., Tokyo (JP)

(72) Inventor: Takahiro Yamasaki, Osaka (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 565 days.

(21) Appl. No.: 14/048,677

(22) Filed: Oct. 8, 2013

(65) Prior Publication Data
US 2014/0037010 A1 Feb. 6, 2014

Related U.S. Application Data

(63) Continuation of application No. 12/654,408, filed on Dec. 18, 2009, now abandoned.

(30) Foreign Application Priority Data

Mar. 2, 2009 (JP) .................................. 2009-048263

(51) Int. Cl.
*H04N 7/36* (2006.01)
*H04N 19/51* (2014.01)
*H04N 19/30* (2014.01)

(52) U.S. Cl.
CPC ..... *H04N 19/00587* (2013.01); *H04N 19/395* (2014.11); *H04N 19/51* (2014.11)

(58) Field of Classification Search
None
See application file for complete search history.

(56) References Cited

U.S. PATENT DOCUMENTS

| 6,134,270 | A | * | 10/2000 | Mou | ........................ G06T 9/007 375/240.21 |
| 2001/0016078 | A1 | | 8/2001 | Go | |
| 2005/0157797 | A1 | * | 7/2005 | Gaedke | ................ H04N 19/105 375/240.24 |

(Continued)

OTHER PUBLICATIONS

Anne Aaron et al.,"Transform-domain Wyner-Ziv Codec for Video" In Proc, SPIE Visual Communications and Image Processing, San Jose, CA (2004).

(Continued)

*Primary Examiner* — Frederick Bailey
(74) *Attorney, Agent, or Firm* — Rabin & Berdo, P.C.

(57) ABSTRACT

A video sequence is encoded by encoding key frames to obtain coded data and non-key frames to obtain error-correcting information. In the encoding process, key frame data are stored in a buffer, first motion information pertaining to the key frames is obtained, and the first motion information is applied to the stored key frame data to generate predicted key frame data. Second motion information pertaining to the non-key frames is also obtained and used to generate predicted non-key frame data. Either the first motion information is obtained from the second motion information, or the second motion information is obtained from the first motion information. The encoder accordingly does not have to obtain motion information from the decoder, and can estimate the amount of error-correcting information to send to the decoder.

7 Claims, 16 Drawing Sheets

(56) References Cited

U.S. PATENT DOCUMENTS

| | | | |
|---|---|---|---|
| 2006/0088100 A1* | 4/2006 | Han | H04N 19/172 375/240.16 |
| 2006/0133486 A1 | 6/2006 | Boyce | |
| 2006/0274159 A1 | 12/2006 | Kobayashi | |
| 2007/0171981 A1* | 7/2007 | Qi | H04N 19/527 375/240.24 |
| 2008/0205508 A1* | 8/2008 | Ziauddin | H04N 19/436 375/240.01 |
| 2009/0074077 A1 | 3/2009 | Lakus-Becker | |
| 2009/0245386 A1* | 10/2009 | Chen | H04N 19/172 375/240.25 |

OTHER PUBLICATIONS

Limin Liu et al., "Backward Channel Aware Wyner-Ziv Video Coding" in Proceedings of the IEEE International Conference on Image Processing, Atlanta, GA, Oct. 2006.

Catarina Brites et al., "Encoder Rate Control for Transform Domain Wyner-Ziv Video Coding" (ICIP2007).

João Ascenso et al., "Improving Frame Interpolation With Spatial Motion Smoothing for Pixel Domain Distributed Video Coding," 5th EURASIP Conference on Speech and Image Processing, Multimedia Communications and Services, Jul. 2005.

\* cited by examiner

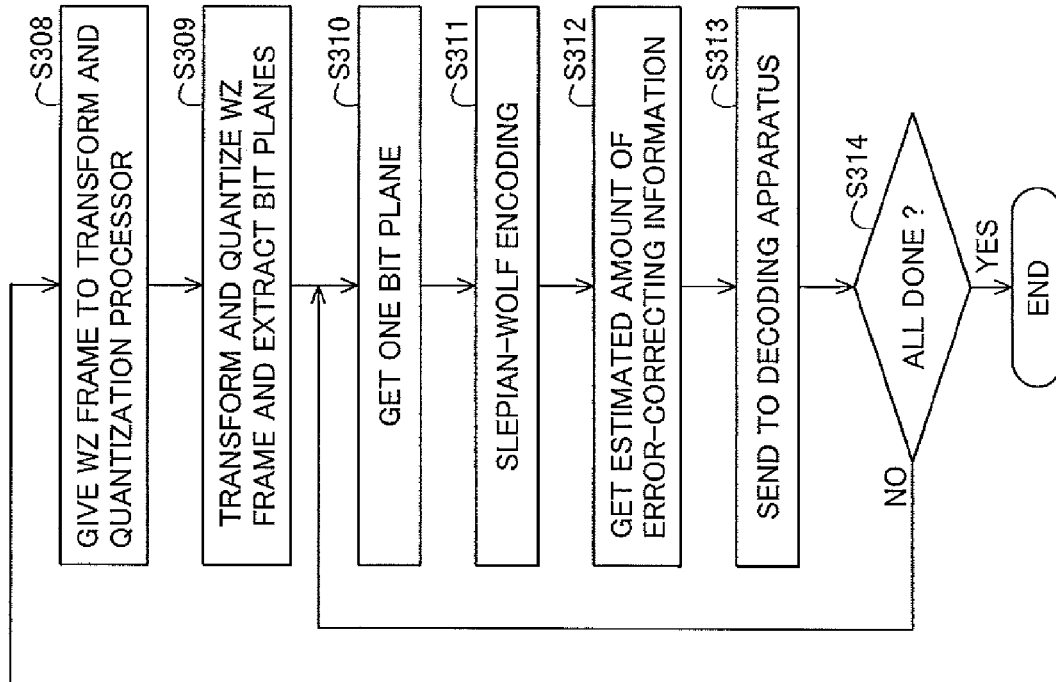
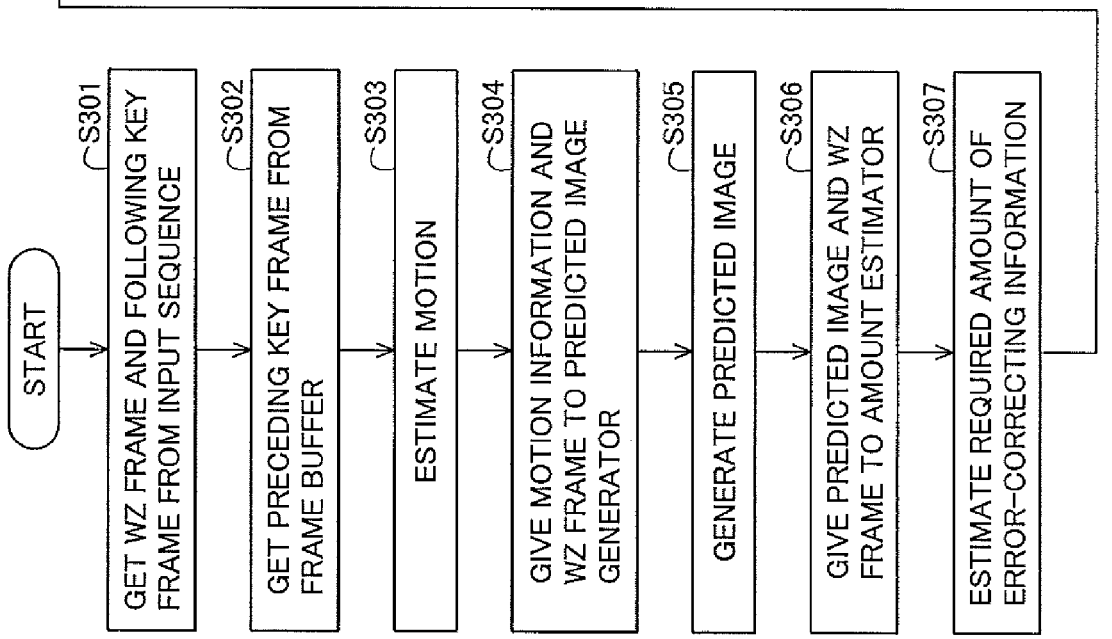
FIG.3

FIG.12

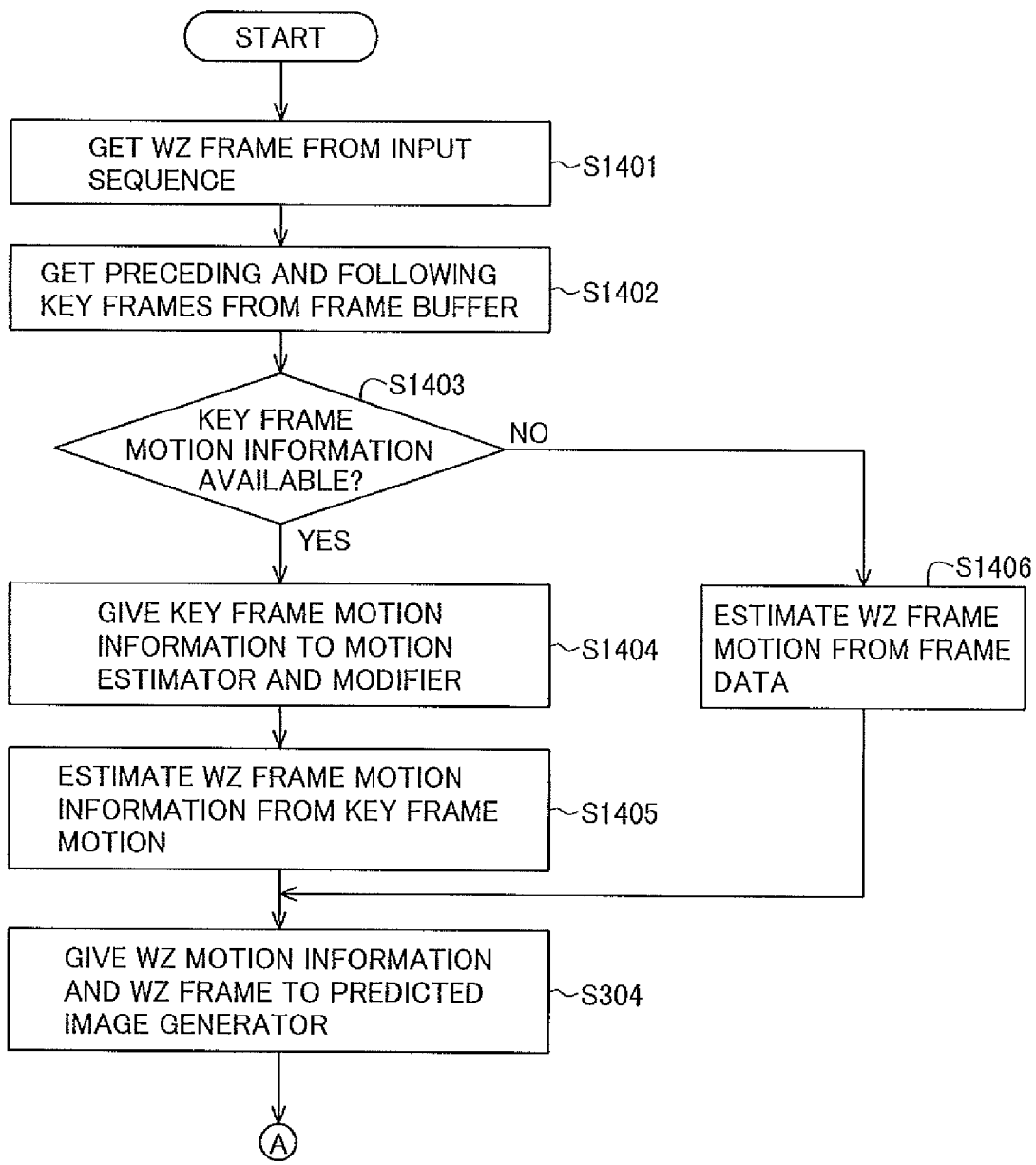

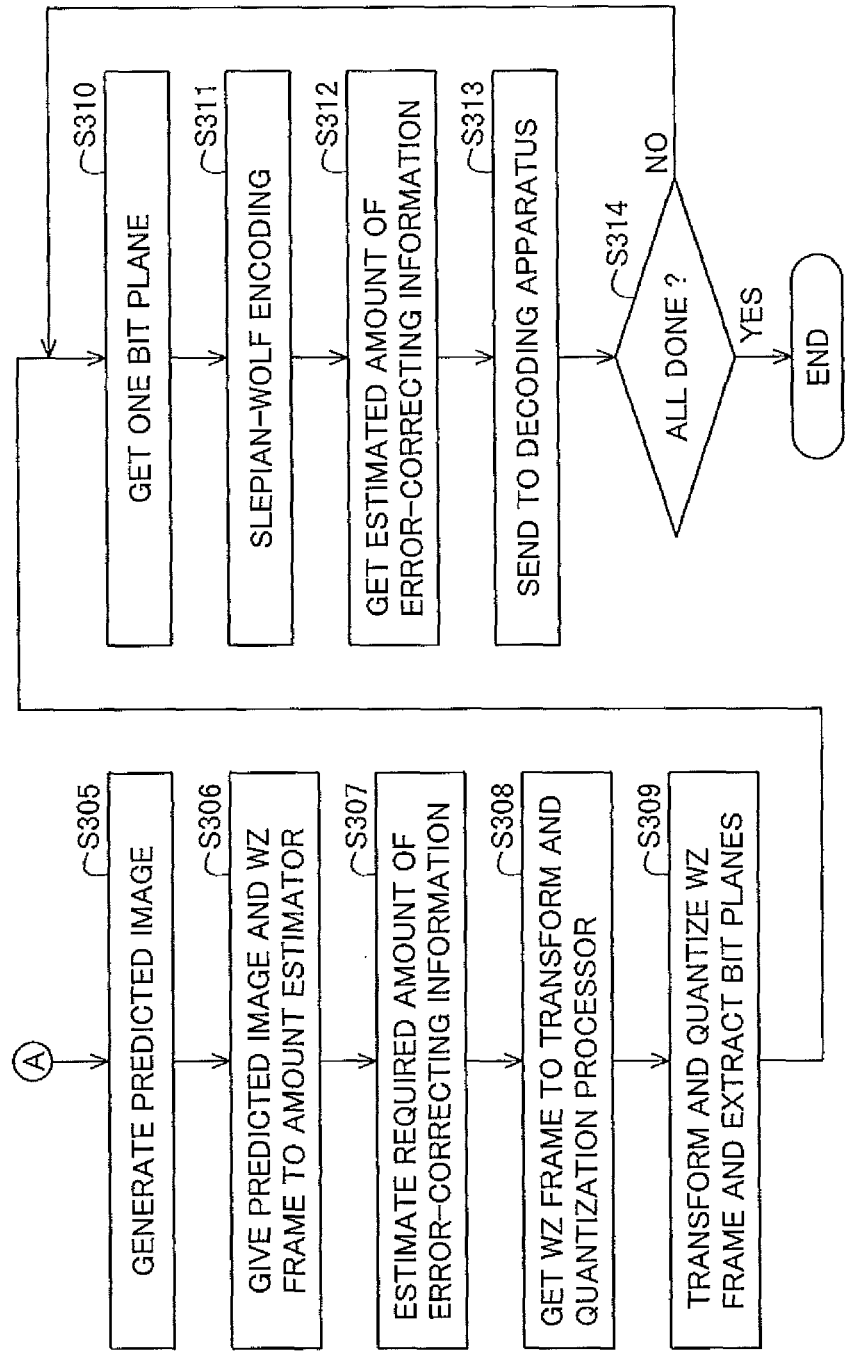

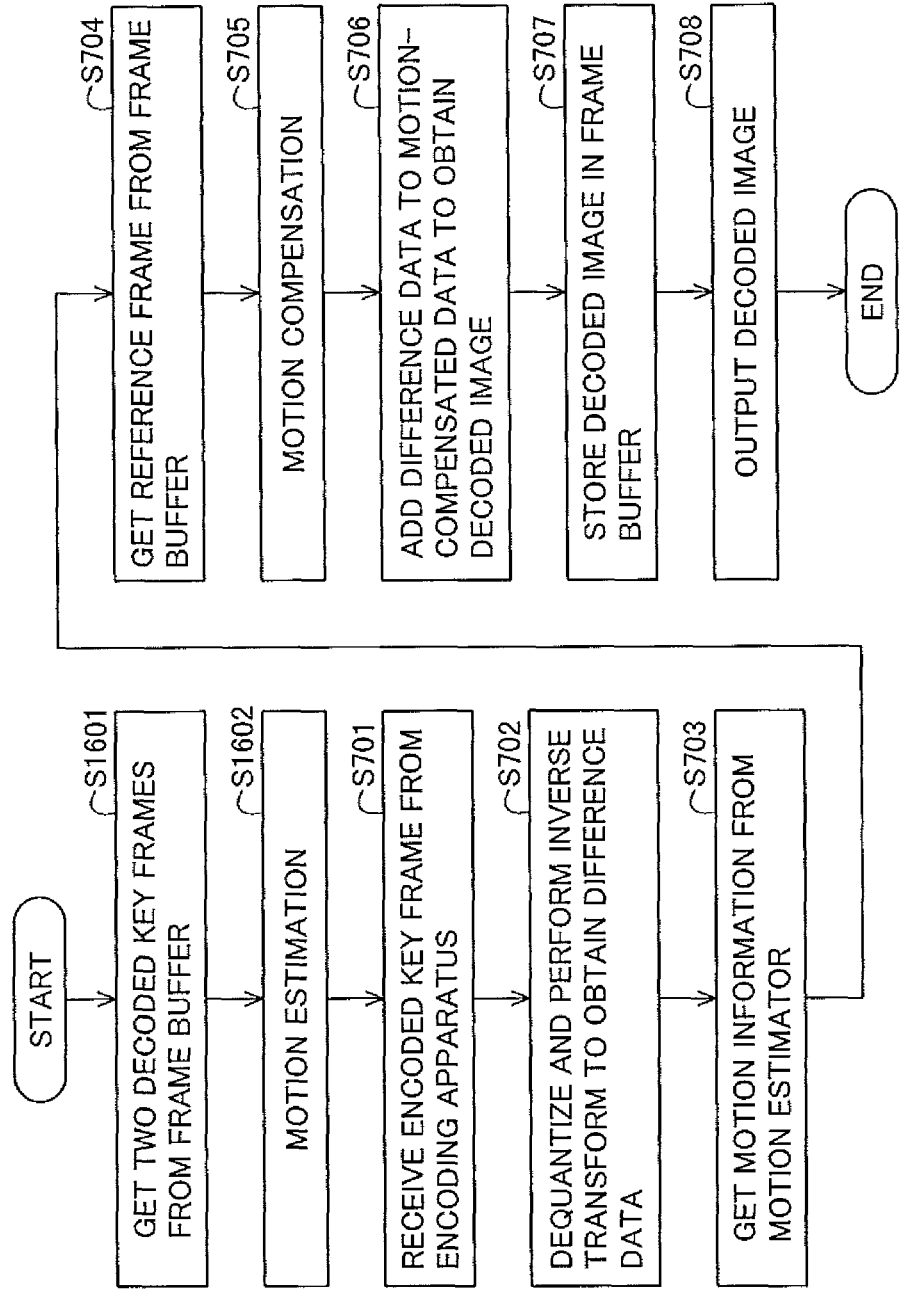

VIDEO ENCODING AND DECODING APPARATUS, METHOD, AND SYSTEM

CROSS-REFERENCE TO RELATED APPLICATIONS

This is a continuation of U.S. patent application Ser. No. 12/654,408, filed Dec. 18, 2009, and furthermore claims the benefit of foreign priority of Japanese application 2009-048263, filed Mar. 2, 2009. The disclosures of both of these prior applications are incorporated herein by reference.

BACKGROUND OF THE INVENTION

1. Field of the Invention

The present invention relates to video encoding and decoding apparatus and methods applicable in, for example, distributed video coding systems.

2. Description of the Related Art

Distributed video coding (DVC) is a new coding method that has attracted much recent attention. It is based on two key results in information theory, the Slepian-Wolf theorem and the Wyner-Ziv theorem, which showed that data could be compressed as efficiently by two independent encoders as by one encoder.

In DVC coding, the sequence of video frames is divided into key frames and non-key frames. The non-key frames are often referred to as Wyner-Ziv frames or WZ frames. The sequence of key frames is coded by a conventional coding method, and the coded data are sent to the decoder. The sequence of Wyner-Ziv frames is coded independently by a method that generates error-correcting information, generally referred to as parity bits, and only the parity bits, or only some of them, are sent to the decoder. A general feature of DVC coding systems is that they reduce the processing load on the encoder.

A basic DVC coding method is described by Aaron et al. in 'Transform-Domain Wyner-Ziv Codec for Video', *Proc. SPIE Visual Communications and Image Processing,* 2004. In the encoder, the key frames are coded as intraframes. A discrete cosine transform (DCT) is used to transform each Wyner-Ziv frame to the coefficient domain, the coefficients are grouped into bands, the coefficients in the k-th band are quantized by a $2^{Mk}$-level quantizer, the quantized coefficients ($q_k$) are expressed in fixed numbers of bits, and the bit planes are extracted and supplied to a Slepian-Wolf encoder that uses a punctured turbo code to produces data bits and parity bits. The data bits are discarded (as implied but not explicitly shown by Aaron et al. in FIG. 1 of the above reference).

The decoder decodes the key frames, uses the decoded key frames to generate a predicted image for each Wyner-Ziv frame, applies a DCT to convert the predicted image to the coefficient domain, groups the coefficients into bands, and inputs the coefficients in each band as side information to a Slepian-Wolf decoder. The Slepian-Wolf decoder uses parity bits received from the encoder to correct prediction errors in the side information by an iterative process, in which the decoder originally receives a subset of the parity bits and may request further parity bits as required. When a satisfactory decoded result is obtained, an inverse discrete cosine transform (IDCT) is applied to reconstruct the image of the Wyner-Ziv frame.

A problem with this method is that since the key frames are coded as intraframes, they cannot be coded efficiently.

A proposed solution to this problem, described by Liu et al. in 'Backward Channel Aware Wyner-Ziv Video Coding', *Proc. IEEE International Conference on Image Processing,* Atlanta, Ga., October 2006, is to have the encoder perform interframe coding of the key frames, using motion estimation information supplied from the decoder on a feedback channel. The encoder can then perform efficient interframe coding with motion compensation, without having to perform the computationally intensive motion estimation processing.

The feedback channel is also used in the encoder described by Aaron et al., when the decoder requests further parity bits.

A basic problem with the use of a feedback channel is that in some applications, no feedback channel is available. Another problem is that if a feedback channel is used to request further parity bits, generating and sending the successive requests for more parity bits takes extra time and delays the decoding process.

In 'Encoder Rate Control for Transform Domain Wyner-Ziv Video Coding', *ICIP* 2007, Brites et al. describe a DVC system that does not use a feedback channel. Instead, the encoder estimates the number of parity bits that the decoder will need for adequate decoding of each Wyner-Ziv frame by performing limited motion estimation, generating a predicted image, and comparing this predicted image with the original image. The encoder then sends the decoder the estimated number of parity bits without having to be asked for them.

The methods proposed by Liu et al. and Brites et al. could in theory be combined to improve the efficiency of both key frame encoding, by performing interframe coding, and Wyner-Ziv decoding, by eliminating the need for the decoder to request additional parity bits, but this hypothetical combination would still require a feedback channel to supply motion information from the decoder to the key frame encoder.

SUMMARY OF THE INVENTION

An object of the present invention is to provide an efficient a DVC system that does not require a feedback channel.

The invention provides a novel method of encoding a sequence of moving-picture frames that has been divided into a sequence of key frames and a sequence of non-key frames to obtain coded data representing the key frames and error-correcting information representing the non-key frames. The method includes the steps of:

storing key frame data in a buffer;

obtaining first motion information pertaining to the key frames;

applying the first motion information to the key frame data stored in the buffer to generate predicted key frames;

obtaining second motion information pertaining to the non-key frames; and using the second motion information to generate predicted non-key frames.

A feature of the novel method is that the first motion information is obtained from the second motion information, or alternatively, the second motion information is obtained from the first motion information.

The novel method may include the further steps of:

obtaining the coded data representing some of the key frames by encoding differences between the key frames and the predicted key frames;

obtaining the error-correcting information representing the non-key frames by encoding the non-key frames; and using the predicted non-key frames to decide how much of the error-correcting information to output.

The invention also provides an encoder that operates by the novel method.

The invention further provides an encoding and decoding system including an encoder that operates by the novel method and a decoder that receives the coded data, error-correcting information, and first motion information generated in the encoder and uses the first motion information in decoding the coded data.

In the novel method, the encoder generates its own motion information and can use the motion information to decide how much error-correcting information to transmit to the decoder, so the encoder does not need to receive motion information or requests for error-correcting information from the decoder. Accordingly, no feedback channel is necessary.

The novel method is efficient because it uses motion compensation but reduces the frequency with which the computationally intensive process of estimating motion from frame data has to be executed.

BRIEF DESCRIPTION OF THE DRAWINGS

In the attached drawings:

FIG. 3 is a flowchart illustrating the encoding of Wyner-Ziv frames in the first embodiment;

FIG. 12 is a block diagram of an encoding and decoding system illustrating a third embodiment of the invention;

FIGS. 14 and 15 form a flowchart illustrating the encoding of Wyner-Ziv frames in the third embodiment; and FIG. 16 is a flowchart illustrating the decoding of Wyner-Ziv frames in the third embodiment.

DETAILED DESCRIPTION OF THE INVENTION

Figure 1:
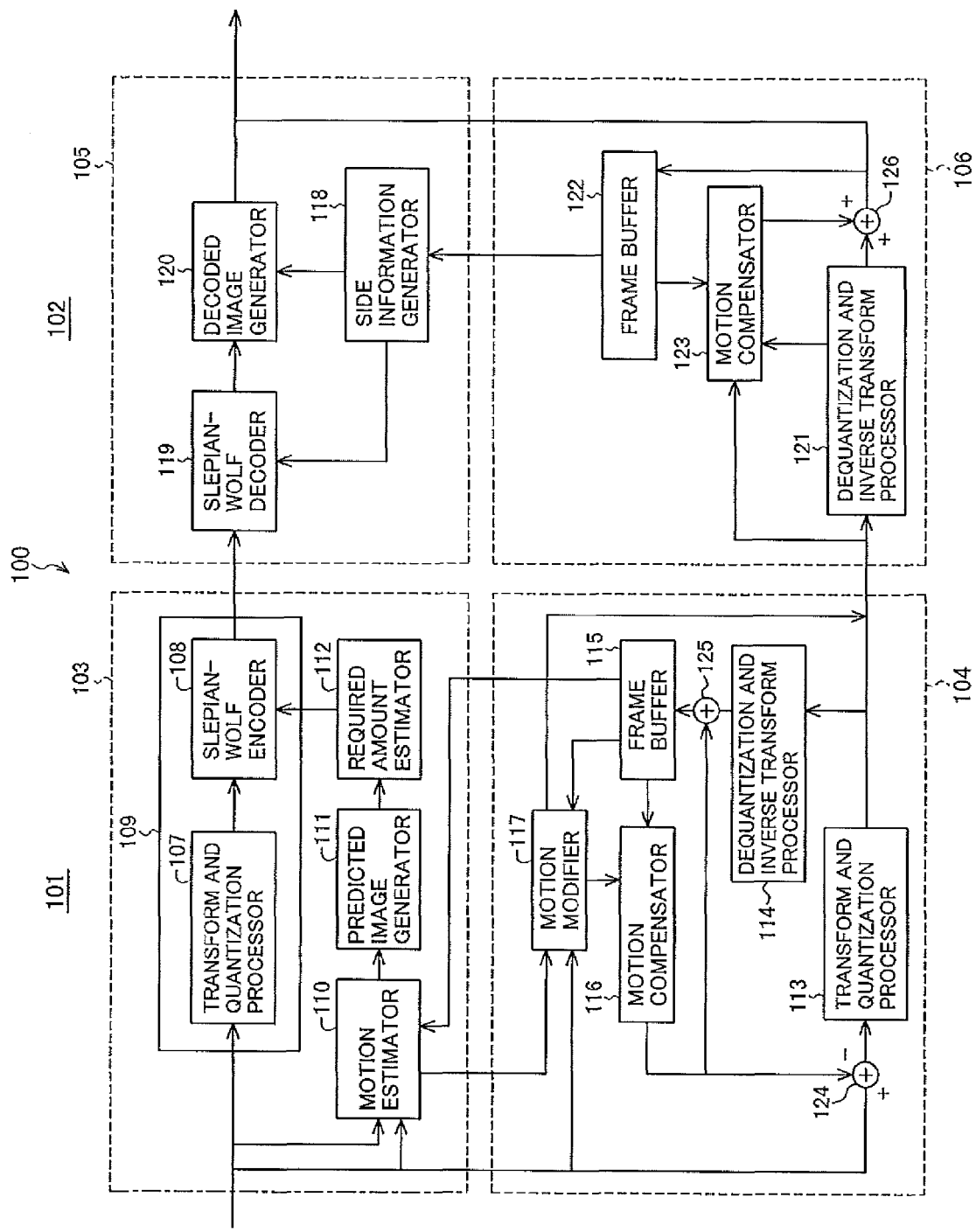
FIG. 1 is a block diagram of an encoding and decoding system illustrating a first embodiment of the invention.

Embodiments of the invention will now be described with reference to the attached drawings, in which like elements are indicated by like reference characters.

First Embodiment

Referring to FIG. 1, the first embodiment is a distributed video coding system including a moving picture encoding apparatus 101 and a moving picture decoding apparatus 102. Either or both of the moving picture encoding apparatus 101 and moving picture decoding apparatus 102 may be implemented either with specialized hardware, or by using a general purpose computing device having a central processing unit (CPU), read-only memory (ROM), random-access memory (RAM), and other well-known facilities to execute an encoding or decoding program, the blocks in FIG. 1 being functional blocks of the program.

The moving picture encoding apparatus 101 includes a Wyner-Ziv frame encoder 103 and a key frame encoder 104. The moving picture decoding apparatus 102 includes a Wyner-Ziv frame decoder 105 and a key frame decoder 106. The moving picture encoding apparatus 101 receives an input sequence of moving-picture frames which includes a key frame sequence and a Wyner-Ziv frame sequence.

The Wyner-Ziv frame encoder 103 includes a Wyner-Ziv frame encoding unit 109, a motion estimator 110, a predicted image generator 111, and a required amount estimator 112. The Wyner-Ziv frame encoding unit 109 includes a transform and quantization processor 107 and a Slepian-Wolf encoder 108. The Wyner-Ziv frame encoder 103 codes Wyner-Ziv frames. The motion estimator 110 functions as the second motion information generator.

The key frame encoder 104 includes a transform and quantization processor 113, a dequantization and inverse transform processor 114, a frame buffer 115, a motion compensator 116, a motion modifier 117, a subtractor 124, and an adder 125. The key frame encoder 104 performs intraframe and interframe encoding of key frames. The motion modifier 117 functions as the first motion information generator.

The transform and quantization processor 107 receives a Wyner-Ziv frame (more precisely, the image data of the Wyner-Ziv frame) from an input sequence (frame sequence), transforms the frame data to the coefficient domain by a discrete cosine transform, for example, quantizes the coefficients, and divides the quantized coefficient data into bit planes.

The Slepian-Wolf encoder 108 performs Slepian-Wolf encoding of one bit plane at a time and sends resulting error-correcting information to the Wyner-Ziv frame decoder 105. The amount of error-correcting information sent is determined by the required amount estimator 112.

The motion estimator 110 receives the key frame preceding the Wyner-Ziv frame being encoded (more precisely, locally decoded image data of the key frame) from frame buffer 115. From the input sequence, the motion estimator 110 receives the Wyner-Ziv frame being encoded and the key frame following the Wyner-Ziv frame being encoded. On the basis of the received frame data, the motion estimator 110 estimates motion in the Wyner-Ziv frame.

The predicted image generator 111 generates a predicted image for the Wyner-Ziv frame being encoded, by using the motion information estimated by the motion estimator 110 and the key frame preceding or following the Wyner-Ziv frame or the key frames preceding and following the Wyner-Ziv frame.

The required amount estimator 112 compares the predicted image generated by the predicted image generator 111 with the original image of the Wyner-Ziv frame and estimates the amount of error-correcting information to be sent.

In interframe encoding of key frames, the subtractor 124 in the key frame encoder 104 takes the difference between the current key frame (the frame to be encoded) and a past key frame after motion compensation. In intraframe encoding, the subtractor 124 simply passes the current key frame data through without taking a difference.

The transform and quantization processor 113 transforms the output of the subtractor 124 to the coefficient domain by a discrete cosine transform, for example, quantizes the resulting coefficients, and sends the resulting coded data to the key frame decoder 106.

The dequantization and inverse transform processor 114 performs a dequantization process and an inverse transform on the output of the transform and quantization processor 113, performing processes reverse to the processes executed by the transform and quantization processor 113. The dequantization and inverse transform processes performed in the dequantization and inverse transform processor 114 constitute a local decoding process, or part thereof. In interframe encoding, the dequantization and inverse transform processor 114 obtains the decoded difference between the current key frame and a preceding key frame after motion compensation. In intraframe encoding, the dequantization and inverse transform processor 114 obtains the locally decoded image data of the current key frame.

In interframe encoding, the adder 125 adds the preceding key frame data, after motion compensation, to the locally decoded difference data to obtain the locally decoded current key frame data. In intraframe encoding, the adder 125 just passes the locally decoded key frame data output from the dequantization and inverse transform processor 114 on to frame buffer 115, without adding any preceding frame data.

Frame buffer 115 stores the locally decoded key frame as reference key frame data.

The motion modifier 117 receives the input key frame sequence and the reference key frame data stored in frame buffer 115, and generates key frame motion information for the key frames by modifying the Wyner-Ziv frame motion information estimated by the motion estimator 110.

The motion compensator 116 receives the motion information from the motion modifier 117 and the reference frame data stored in frame buffer 115 and performs motion compensation.

The Wyner-Ziv frame decoder 105 in the moving picture decoding apparatus 102 includes a side information generator 118, a Slepian-Wolf decoder 119, and a decoded image generator 120, which cooperatively decode Wyner-Ziv frames.

The key frame decoder 106 in the moving picture decoding apparatus 102 includes a dequantization and inverse transform processor 121, a frame buffer 122, a motion compensator 123, and an adder 126, which perform intraframe and interframe decoding of encoded key frames.

The dequantization and inverse transform processor 121 receives an encoded key frame from the key frame encoder 104 and performs the reverse of the processing executed by the transform and quantization processor 113. If the transform and quantization processor 113 performs a discrete cosine transform and quantization, for example, the dequantization and inverse transform processor 121 performs dequantization and an inverse discrete cosine transform. If the received key frame was interframe-encoded, these processes produce data corresponding to the difference between the current key frame and a past key frame after motion compensation. If the key frame was intraframe-encoded, these processes produce the image data of the current key frame.

If interframe encoding was performed, the adder 126 adds the difference data output from the dequantization and inverse transform processor 121 to the motion-compensated data of a past key frame to obtain the decoded image data of the current key frame. If intraframe encoding was performed, the adder 126 just passes the image data output from the dequantization and inverse transform processor 121 through as the decoded image data of the current key frame, without adding any difference data.

Frame buffer 122 stores the decoded image data of the current key frame as reference data and for use in the generation of predicted images.

If interframe encoding was performed, the motion compensator 123 receives key frame motion information from the key frame encoder 104 and reference key frame data from frame buffer 122 and performs motion compensation to generate the motion-compensated data mentioned above.

The side information generator 118 in the Wyner-Ziv frame decoder 105 receives decoded key frame data from frame buffer 122, generates a predicted image for the Wyner-Ziv frame to be decoded, transforms and quantizes the predicted image, and divides the resulting data into bit planes.

The Slepian-Wolf decoder 119 applies error-correcting information (parity bits) received from the Wyner-Ziv frame encoder 103 to the bit plane data output from the side information generator 118 and performs Slepian-Wolf decoding, one bit plane at a time.

The decoded image generator 120 assembles the decoded bit planes and performs inverse quantization and an inverse transform to generate a decoded image. Depending on the outcome of Slepian-Wolf decoding, the decoded image generator 120 may use the predicted bit plane output from the side information generator 118 instead of the decoded bit plane data output from the Slepian-Wolf decoder 119.

The operation of the moving picture coding system 100 in the first embodiment will now be described with reference to FIG. 1 and the flowcharts in FIGS. 2 to 7.

The input sequence (frame sequence) is divided into a key frame sequence and a Wyner-Ziv frame sequence, and these sequences are encoded and decoded separately. Processing of a sequence in which key frames alternate with Wyner-Ziv frames will be described below as an example.

Figure 2:
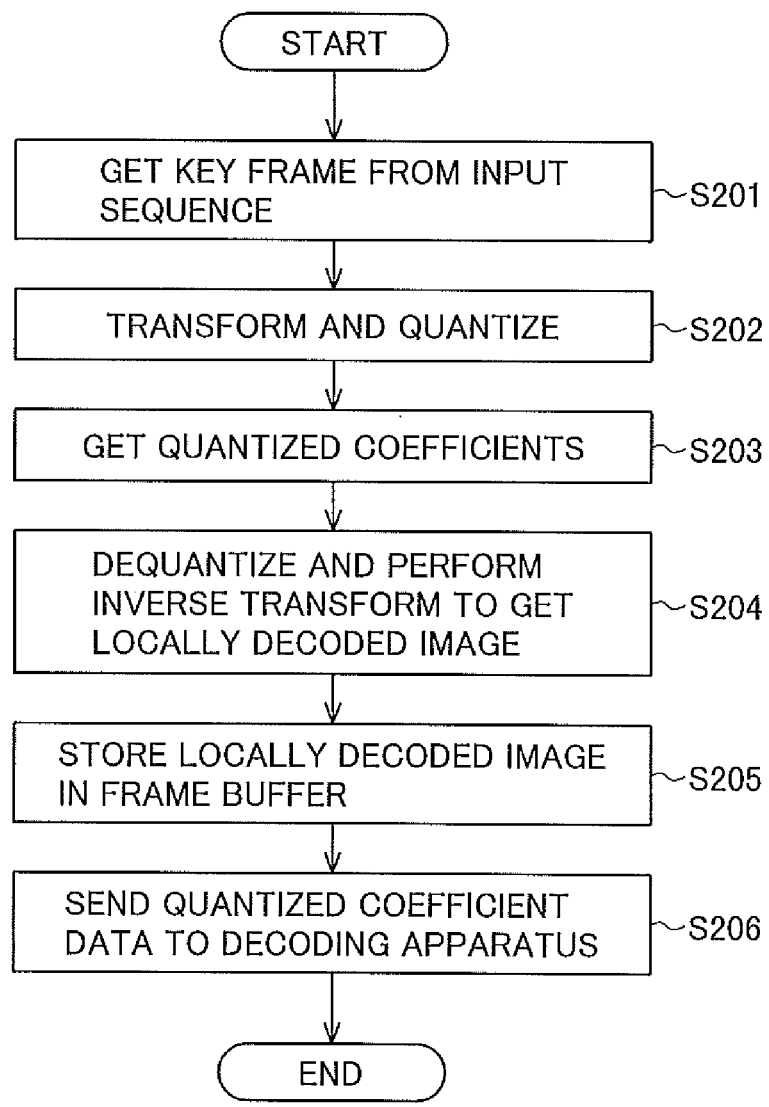
FIG. 2 is a flowchart illustrating the intraframe encoding of key frames in the first embodiment.

Encoding of the first frame in the sequence will be described with reference to FIGS. 1 and 2. The first frame is a key frame and has no past key frame data that can be referred to, so the key frame encoder 104 performs intraframe encoding.

In intraframe encoding, a key frame (in this case, the first frame) is taken from the input sequence and input to the transform and quantization processor 113 (step S201). There the key frame is transformed to the coefficient domain and the coefficients are quantized (step S202).

Local decoding is now performed to allow the transformed frame information to be used as reference frame data in subsequent interframe encoding or for the generation of a predicted image. The quantized coefficients are input to the dequantization and inverse transform processor 114 (step S203), a dequantization process and an inverse transform are carried out, and a locally decoded image for the first frame is generated (step S204). The locally decoded image is stored in frame buffer 115 (step S205).

The transform and quantization processor 113 also sends the resulting coded data to the key frame decoder 106 (step S206).

Encoding of the second frame will be described with reference to FIGS. 1 and 3. The second frame is a Wyner-Ziv frame and is encoded by the Wyner-Ziv frame encoder 103.

The original image data of the Wyner-Ziv frame (the second frame) and the following key frame (the third frame) are taken from the input sequence and input to the motion estimator 110 (step S301). The locally decoded image data of the preceding key frame (the first frame) are taken from frame buffer 115 and input to the motion estimator 110 (step S302).

The motion estimator 110 uses the data of the Wyner-Ziv frame and the preceding and following key frames to perform motion estimation (step S303) and obtains motion information, which it supplies to the predicted image generator 111 together with the Wyner-Ziv frame and the preceding and following key frames (step S304). Any motion estimation method may be used: for example, the limited search method described by Brites et al. may be used to reduce the amount of computation.

The predicted image generator 111 receives the input motion information, the preceding and following key frames, and the Wyner-Ziv frame, generates a predicted image (step S305), and supplies the predicted image to the required amount estimator 112 together with the original image of the Wyner-Ziv frame (step S306).

The required amount estimator 112 compares the predicted image generated by the Wyner-Ziv frame decoder 105 with the original image of the Wyner-Ziv frame, estimates the amount of error in the predicted image, and estimates the amount of error-correcting information that will be needed to correct errors in each bit plane (step S307). Any method of error-correcting information estimation may be used: for example, the method described by Brites et al. may be used.

The original image of the Wyner-Ziv frame (the second frame) as taken from the input sequence is input to the transform and quantization processor 107 (step S308), where the input image is transformed to the coefficient domain, and the transformed data are quantized, and bit planes are extracted (step S309).

A single bit plane is now input to the Slepian-Wolf encoder 108 (step S310) to undergo Slepian-Wolf encoding (step S311). The estimate made by the required amount estimator 112 is input to the Slepian-Wolf encoder 108 (step S312). The Slepian-Wolf encoder 108 supplies the Wyner-Ziv frame decoder 105 with the amount of error-correcting information estimated to be necessary by the required amount estimator 112 (step S313).

Steps S310, S311, S312, and S313 are repeated for each of the bit planes (step S314).

Figure 4:
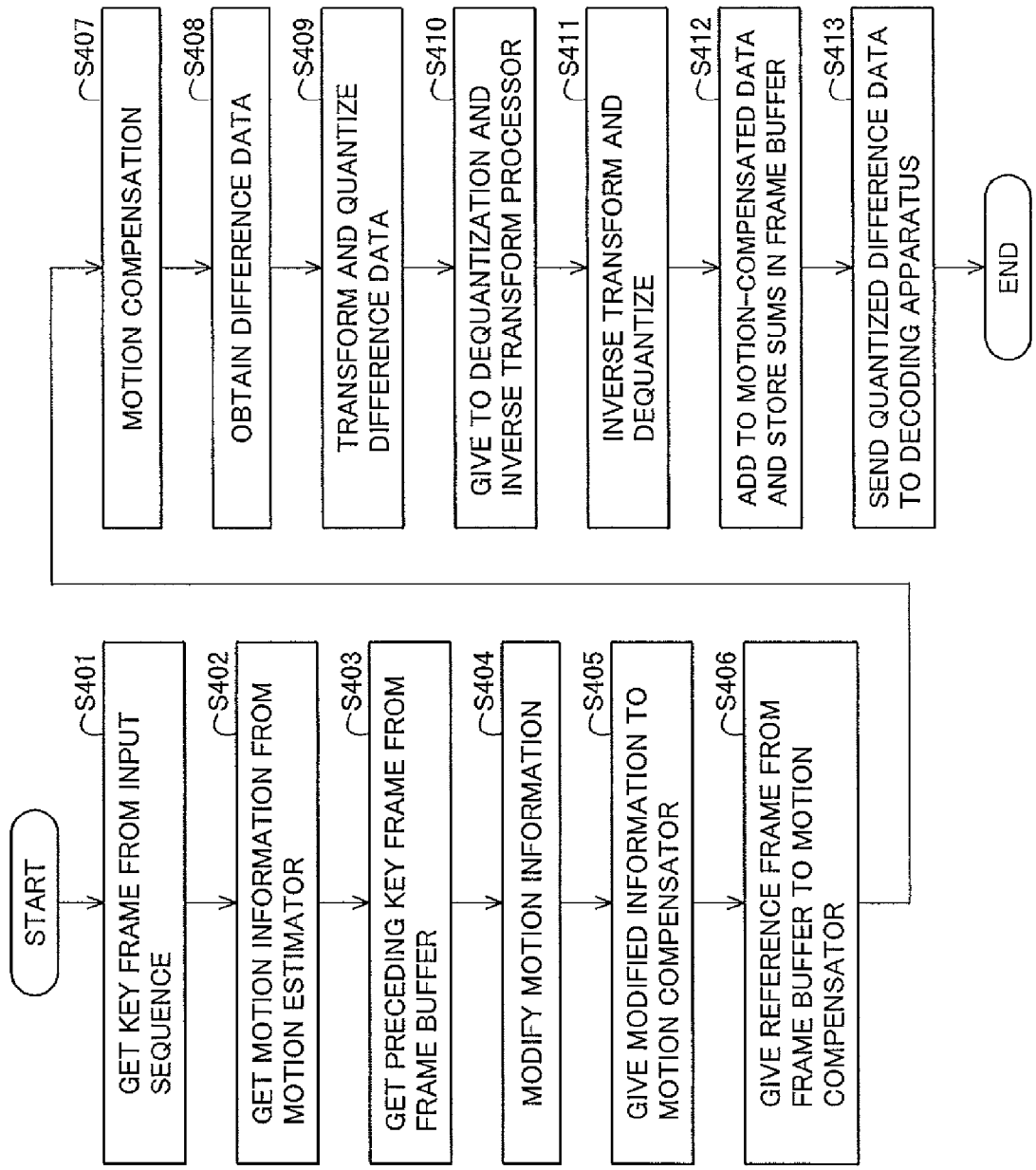
FIG. 4 is a flowchart illustrating the interframe encoding of key frames in the first embodiment.

Encoding of the third frame will be described with reference to FIGS. 1 and 4. The third frame is a key frame. Since past key frame data (the first frame) is available, the key frame encoder 104 performs interframe encoding.

The motion modifier 117 receives the third frame from the input sequence (step S401), receives motion information describing estimated motion between the second and third frames from the motion estimator 110 (step S402), and receives locally decoded image data for the preceding key frame (the first frame) from frame buffer 115 (step S403). The motion modifier 117 modifies the estimated second-to-third-frame motion information to generate key frame motion information describing estimated motion between the first and third frames (step S404). For example, the key frame motion information may be obtained by extrapolation of the motion information between the second and third frames. Interpolation will be described later. Extrapolation may be carried out in an analogous manner.

After extrapolation of the second-to-third-frame motion information, the extrapolated motion information may be further modified. A small search area (such as three pixels by three pixels) may be specified around the extrapolated motion position, and a motion search may be made within this limited search area to find the position that gives the strongest correlation. The motion information found by this search is then used as the key frame motion information.

The key frame motion information is supplied from the motion modifier 117 to the motion compensator 116 (step S405). The image data for the reference frame (in this case, the first frame) are supplied from frame buffer 115 to the motion compensator 116 (step S406). The motion compensator 116 uses the reference frame and the key frame motion information to perform motion compensation (step S407). Any motion compensation method may be used, including the methods described by the Moving Picture Experts Group (MPEG) and other methods used in known video encoding and decoding systems.

The difference between the motion-compensated image output from the motion compensator 116 and the original image of the third frame taken from the input sequence is then obtained (step S408) and supplied to the transform and quantization processor 113, where the difference data are transformed and quantized to obtain an encoded image (step S409).

The encoded image is now locally decoded for future use as reference frame data or in generation of a predicted image. In this process, the data output from the transform and quantization processor 113 are input to the dequantization and inverse transform processor 114 (step S410). The dequantization and inverse transform processor 114 performs a dequantization process and an inverse transform to obtain locally decoded difference image data representing the difference between the original image of the third frame and the motion compensated image (step S411). The adder 125 adds these data to the motion-compensated data output from the motion compensator 116 to obtain the locally decoded image for the third frame, and the locally decoded image is stored in frame buffer 115 (step S412).

The encoded data output from the transform and quantization processor 113 and the motion information obtained by the motion modifier 117 are sent to the key frame decoder 106 (step S413).

The operation of the moving picture decoding apparatus 102 will now be described, including intraframe decoding of a key frame, decoding of a Wyner-Ziv frame, and interframe decoding of a key frame.

Figure 5:
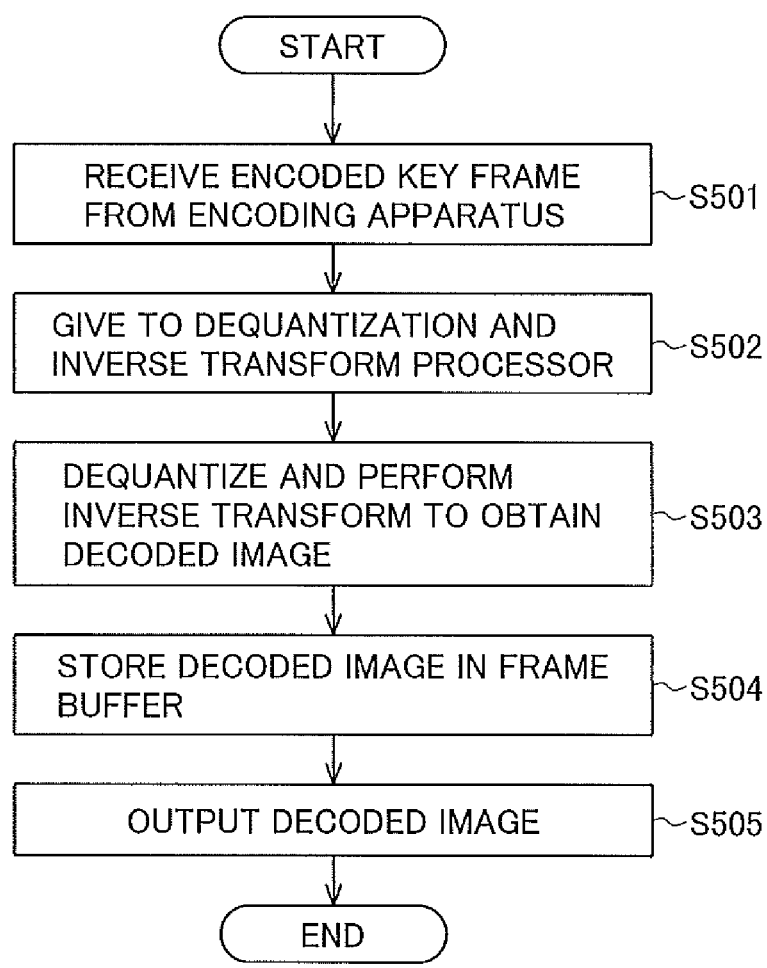
FIG. 5 is a flowchart illustrating the intraframe decoding of key frames in the first embodiment.

Decoding of the first frame will be described with reference to FIGS. 1 and 5. The first frame is a key frame. Since past key frame data that can be referred to are not available, the key frame decoder 106 performs intraframe decoding.

The encoded data of the first frame are supplied to the dequantization and inverse transform processor 121 in the key frame decoder 106 (steps S501 and S502), and a quantization process and an inverse transform are performed (step S503). These processes produce a decoded image because the first frame was encoded by intraframe encoding.

The decoded image is stored in frame buffer 122 (step S504), so that it can be used as reference frame data in interframe decoding of the next key frame and in generation of a predicted image for the next Wyner-Ziv frame. The decoded image is output as well (step S505).

Figure 6:
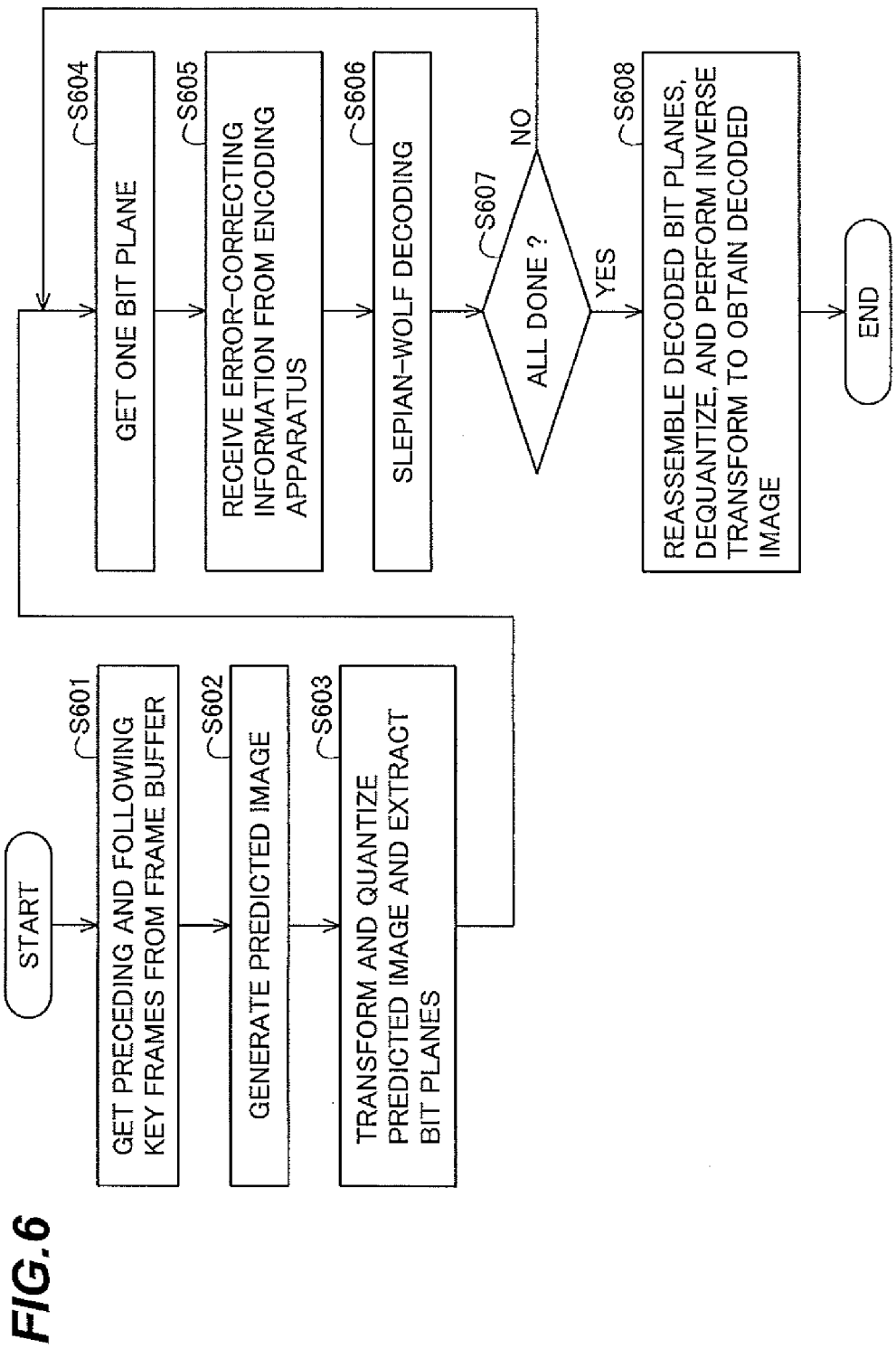
FIG. 6 is a flowchart illustrating the decoding of Wyner-Ziv frames in the first embodiment.

Decoding of the second frame will be described with reference to FIGS. 1 and 6. The second frame is a Wyner-Ziv frame and is decoded in the Wyner-Ziv frame decoder 105.

First, the key frame image data stored in frame buffer 122 for the key frames (the first and third frames) preceding and following the Wyner-Ziv frame being processed (the second frame) are input to the side information generator 118 (step S601). The side information generator 118 generates a predicted image for the Wyner-Ziv frame (step S602). Any method of generating the predicted image from the preceding and following frames may be used: for example, the method described by Ascenso et al. in 'Improving frame interpolation with spatial motion smoothing for pixel domain distributed video coding', 5th *EURASIP Conference on Speech and Image Processing*, Multimedia Communications and Services, July 2005 may be used. If the preceding and following key frames were encoded as interframes, their motion information may be used.

The side information generator 118 also transforms and quantizes the predicted image and divides the quantized data into bit planes (step S603).

The side information generator 118 supplies a single bit plane to the Slepian-Wolf decoder 119 (step S604). The Wyner-Ziv frame encoder 103 supplies error-correcting information to the Slepian-Wolf decoder 119 (step S605). Slepian-Wolf decoding is performed by using the error-correcting information, and the result is supplied to the decoded image generator 120 (step S606).

Steps S604, S605, and S606 are repeated for each of the bit planes (S607). The decoded image generator 120 reassembles the decoded bit planes to reconstruct the Wyner-Ziv frame in the quantized coefficient domain, and performs inverse quantization and an inverse transform to obtain a decoded image. The decoded image is output to a next-stage unit (not shown) for storage, display, or further processing (step S608).

Figure 7:
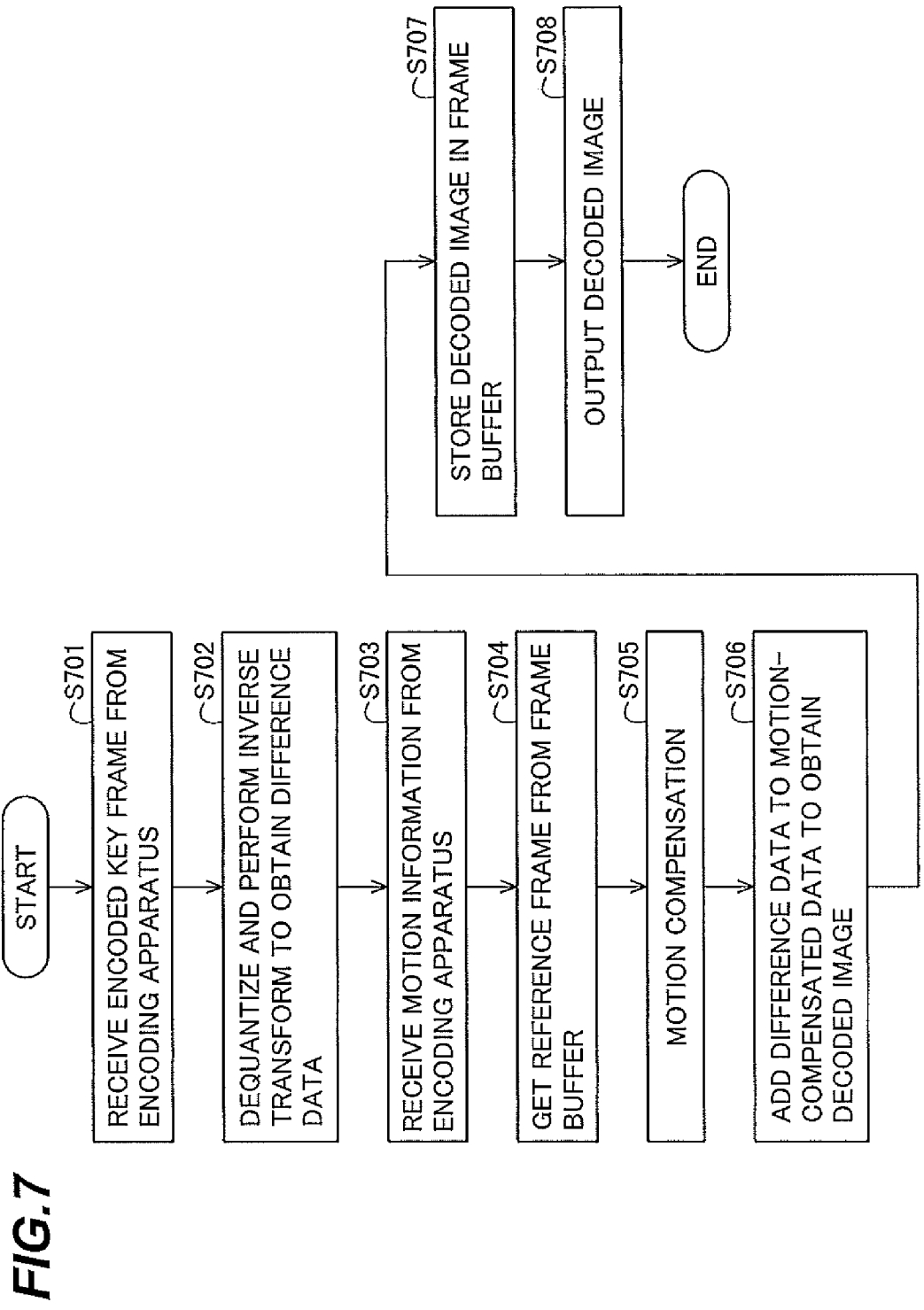
FIG. 7 is a flowchart illustrating the interframe decoding of key frames in the first embodiment.

Decoding of the third frame will be described with reference to FIGS. 1 and 7. The third frame is a key frame. Since past key frame data (for the first frame) that can be referred to are present, the key frame decoder 106 performs interframe decoding.

The encoded third key frame is received from the key frame encoder 104 and input to the dequantization and inverse transform processor 121 (step S701). The dequantization and inverse transform processor 121 performs an inverse transform and inverse quantization to obtain difference image data with respect to the first frame, which is the reference frame for the decoding of the third frame (step S702).

The motion information that was used to encode the third key frame (motion information output from the motion modifier 117) is received from the moving picture encoding apparatus 101 and input to the motion compensator 123 (step S703). Corresponding reference frame data (in this case, the decoded image data for the first frame) are supplied from frame buffer 122 to the motion compensator 123 (step S704). The motion compensator 123 uses the reference frame and the motion information to perform motion compensation (step S705). MPEG motion compensation or any other motion compensation method used in general video encoding and decoding systems may be employed.

The adder 126 adds the difference data output from the dequantization and inverse transform processor 121 to the motion-compensated data output from the motion compensator 123 to obtain a decoded image for the third frame (step S706).

The decoded image is stored in frame buffer 122 so that it can be used as reference frame data or in generation of a predicted image for the Wyner-Ziv frame (step S707) and is output to a next-stage unit, which is not shown (step S708).

The processing of the fourth frame and subsequent even-numbered (Wyner-Ziv) frames is the same as the processing of the second frame described above. The processing of the fifth frame and subsequent odd-numbered (key) frames is generally the same as the processing of the third frame described above. If a monitor unit (not shown) detects a scene change or the like, however, the subsequent frames are processed as a new sequence, starting with intraframe encoding and decoding of the next frame as the first frame in the new sequence.

Since interframe encoding of key frames is performed with motion information obtained from the Wyner-Ziv frame encoder instead of from the moving picture decoding apparatus, and the amount of error-correcting information to transmit is estimated in the Wyner-Ziv frame encoder itself by using this motion information, the need for a feedback channel is eliminated for both Wyner-Ziv frames and key frames. The moving picture coding system in the first embodiment can therefore be used in applications where no feedback channel is available.

Because the motion information estimated in the generation of predicted images for Wyner-Ziv frames is also used, with modification, as interframe key frame motion information, the processing load on the moving picture encoding apparatus is reduced.

Second Embodiment

Figure 8:
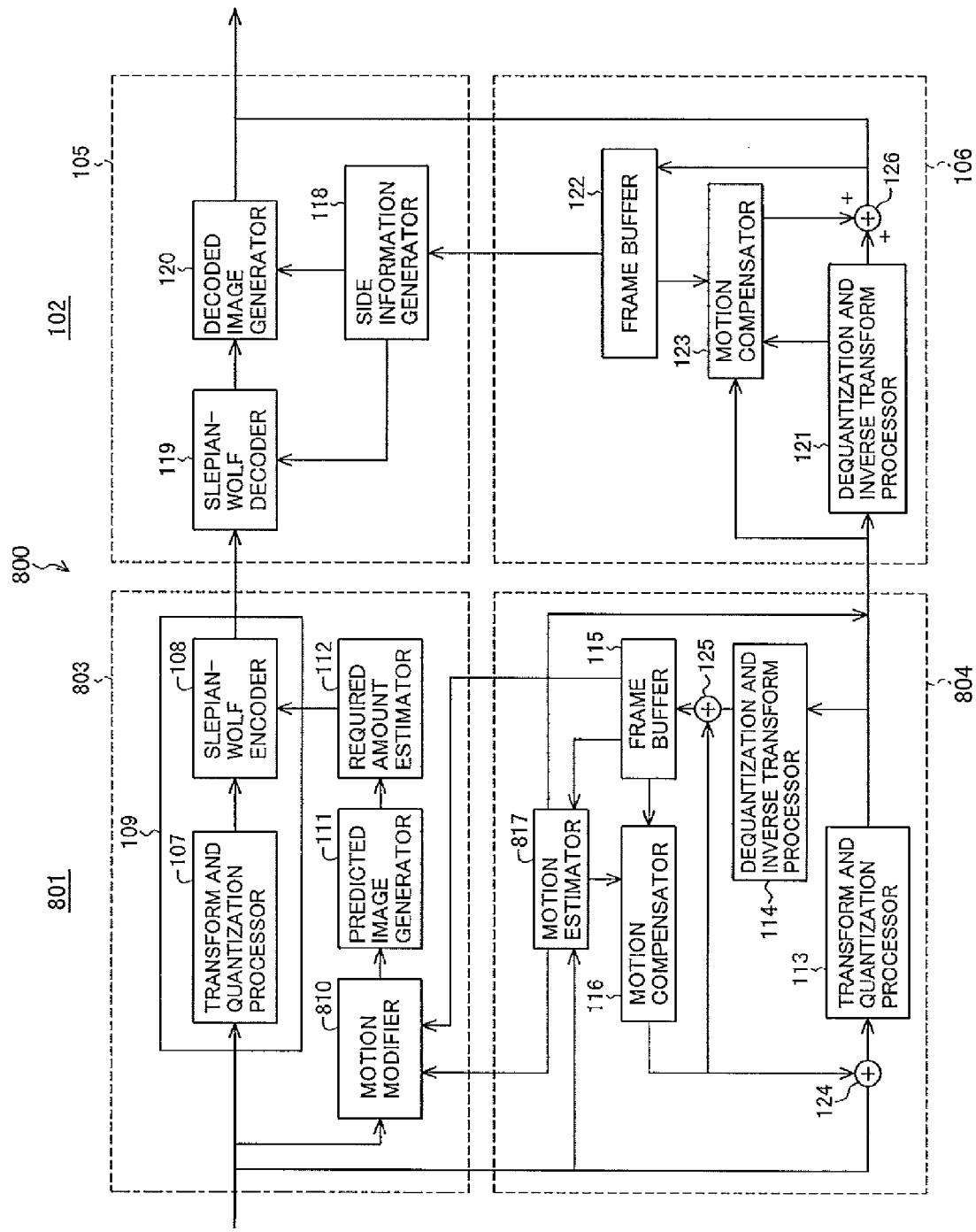
FIG. 8 is a block diagram of an encoding and decoding system illustrating a second embodiment of the invention.

Referring to FIG. 8, the second embodiment is a moving picture coding system 800 including a moving picture encoding apparatus 801 and a moving picture decoding apparatus 102. The moving picture decoding apparatus 102 is the same as in the first embodiment.

The moving picture encoding apparatus 801 includes a Wyner-Ziv frame encoder 803 and a key frame encoder 804.

The Wyner-Ziv frame encoder 803 includes a transform and quantization processor 107 and a Slepian-Wolf encoder 108 that constitute a Wyner-Ziv frame encoding unit 109, a motion modifier 810, a predicted image generator 111, and a required amount estimator 112. The motion modifier 810 functions as the second motion information generator. The elements other than the motion modifier 810 are the same as in the first embodiment.

The key frame encoder 804 includes a transform and quantization processor 113, a dequantization and inverse transform processor 114, a frame buffer 115, a motion compensator 116, a motion estimator 817, a subtractor 124, and an adder 125. The elements other than the motion estimator 817 are the same as in the first embodiment.

The second embodiment differs from the first embodiment only in regard to the motion estimator 817 and the motion modifier 810.

The motion estimator 817 estimates motion between key frames by performing a motion search, for example, on an input key frame and a reference key frame data stored in frame buffer 115.

The motion modifier 810 receives key frame motion information from the motion estimator 817 and modifies it to obtain motion information for Wyner-Ziv frames.

The operation of the moving picture coding system 800 in the second embodiment will now be described with reference to FIGS. 8 to 11. As in the first embodiment, it will be assumed that the input frame sequence consists of odd-numbered key frames and even-numbered Wyner-Ziv frames.

The operation of the moving picture decoding apparatus 102 and the intraframe encoding of key frames (specifically, the first frame) in the key frame encoder 804 are the same as in the first embodiment.

Figure 9:
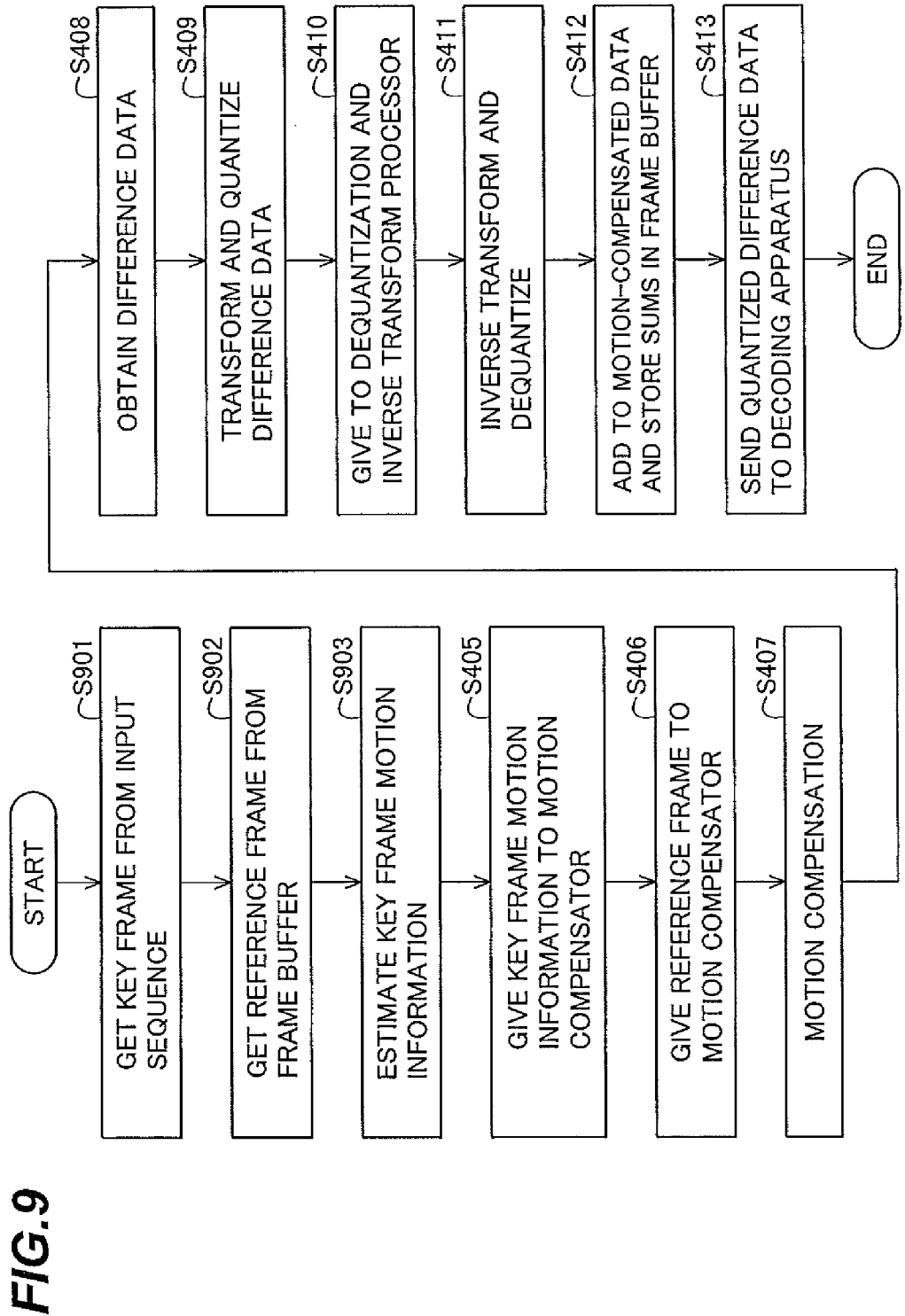
FIG. 9 is a flowchart illustrating the intraframe encoding of key frames in the second embodiment.

Interframe encoding of a key frame (the third frame) will be described with reference to FIGS. 8 and 9.

The image data for the third frame are taken from the input sequence and input to the motion estimator 817 (step S901). The key frame image data for the first frame are supplied from frame buffer 115 to the motion estimator 817 as reference frame data (step S902). The motion estimator 817 estimates key frame motion information from the key frame image data for the first and third frames (step S903).

The subsequent processing is the same as in the first embodiment.

The motion estimator 817 supplies the key frame motion information to the motion compensator 116 (step S405). The image data for the reference frame (in this case, the first frame) are supplied from frame buffer 115 to the motion compensator 116 (step S406). The motion compensator 116 uses the reference frame data and the motion information to perform motion compensation (step S407).

The differences between the data output from the motion compensator 116 and the original image data for the third frame are input to the transform and quantization processor 113 (step S408), where they are transformed and quantized (step S409). The resulting data are input to the dequantization and inverse transform processor 114 (step S410), where they undergo dequantization and an inverse transform to produce difference image data (step S411). The adder 125 adds the data output from the dequantization and inverse transform processor 114 and the data output from the motion compensator 116 to obtain a locally decoded image, which is stored in frame buffer 115 (step S412). The data output from the transform and quantization processor 113 and the motion information obtained from the motion estimator 817 are sent to the key frame decoder 106 (step S413).

Figure 10:
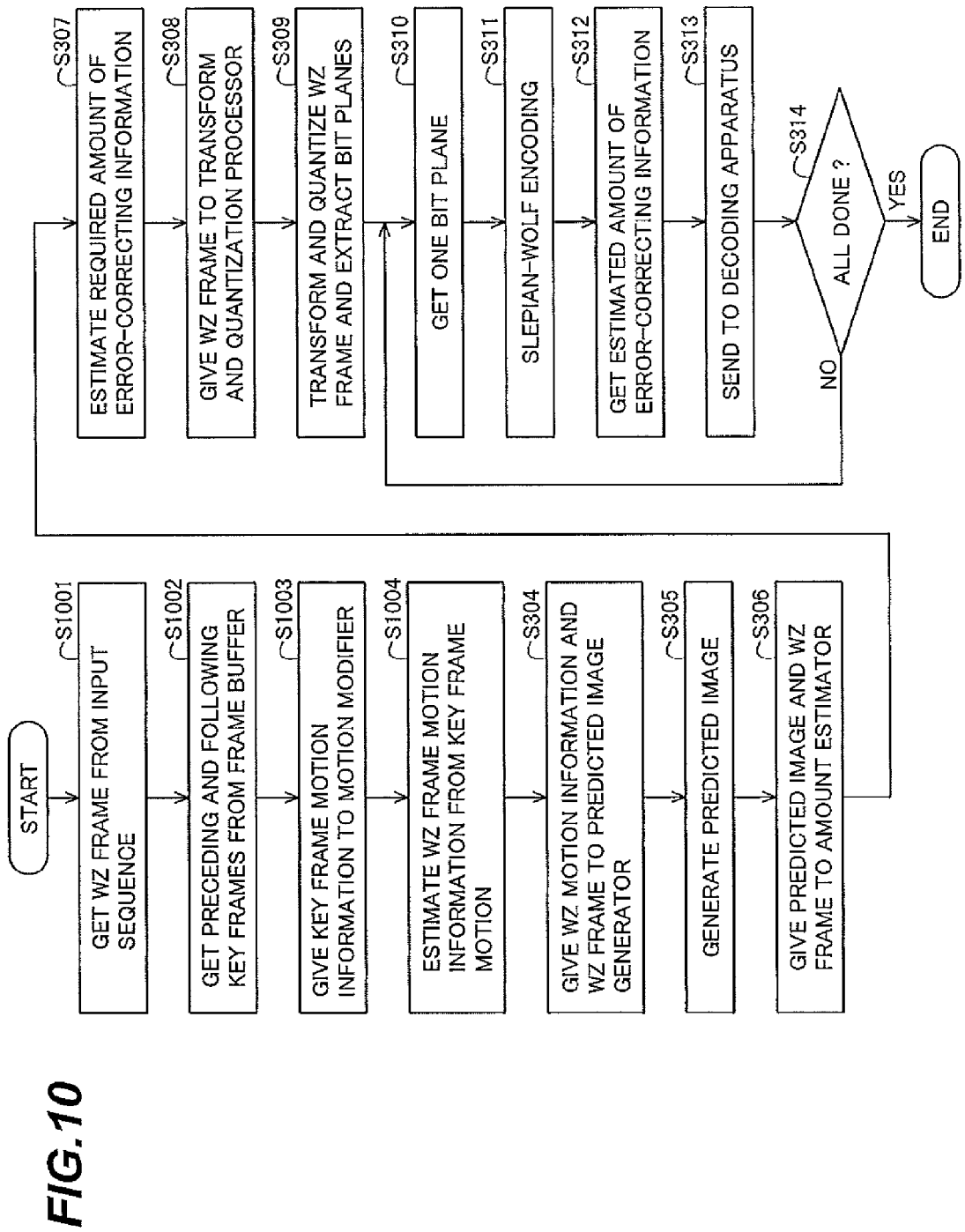
FIG. 10 is a flowchart illustrating the encoding of Wyner-Ziv frames in the second embodiment.

Encoding of a Wyner-Ziv frame (the second frame) will next be described with reference to FIGS. 8 and 10.

The Wyner-Ziv frame image for the second frame is taken from the input sequence and input to the motion modifier 810 (step S1001). Locally decoded images for the first and third frames are supplied from frame buffer 115 to the motion modifier 810 (step S1002). The motion estimator 817 estimates the motion between the first and third frames and supplies the corresponding key frame motion information to the motion modifier 810 (step S1003). The motion modifier 810 receives the key frame motion information and modifies the motion information for the second frame by interpolation or a similar process (step S1004).

Figure 11:
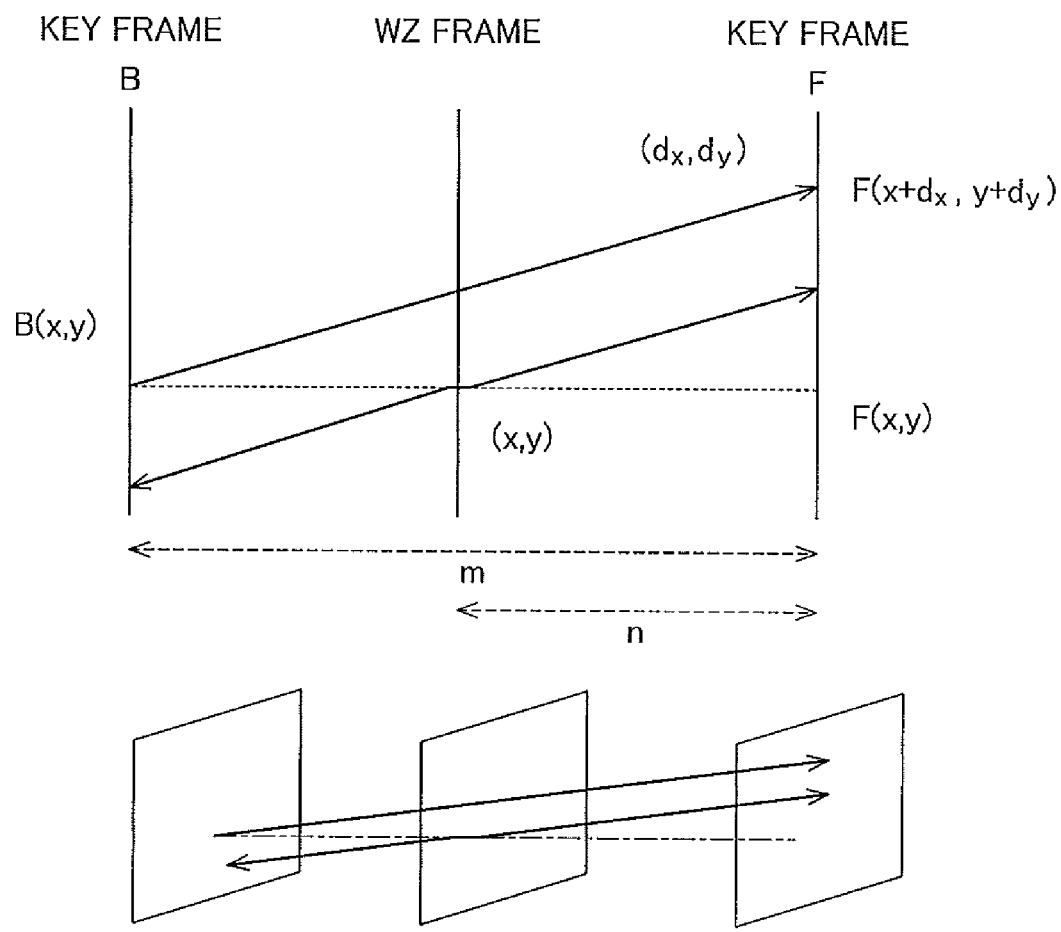
FIG. 11 schematically illustrates the interpolation of motion information in the Wyner-Ziv encoder in the second embodiment.

An exemplary interpolation process for generating motion information for the second frame by modifying the first-to-third frame motion information will be described with reference to FIG. 11.

If a point B(x, y) in the key frame B (in this case, the first frame) preceding a Wyner-Ziv frame moves to a point F(x, y) in the key frame F (in this case, the third frame) following the Wyner-Ziv frame and this motion is expressed as $(d_x, d_y)$, then the motion of the corresponding point (x, y) in the Wyner-Ziv frame with respect to the points B(x, y) and F(x, y) in the preceding and following key frames can be estimated as follows.

Let the distance between the key frames B and F be m and the distance between the Wyner-Ziv frame and the following key frame F be n. If key frames alternate with Wyner-Ziv frames, m is two and n is one.

The motion $(d_{xB}, d_{yB})$ of point (x, y) from the Wyner-Ziv frame to the preceding key frame B (first frame) can be expressed by equation (1) below. The motion $(d_{xF}, d_{yF})$ of point (x, y) from the Wyner-Ziv frame to the following key frame F (third frame) can be expressed by equation (2) below. Given the motion information $(d_x, d_y)$ between the key frames as input, the motion $(d_{xB}, d_{yB})$ and $(d_{xF}, d_{yF})$ between the Wyner-Ziv frame and the key frames can be obtained by interpolation using equations (1) and (2). After motion information is obtained by using either equation (1) or (2), a small search area of about three pixels by three pixels, for example, may be specified around the interpolated motion position, and corrected motion information may be obtained by searching for the strongest correlation in this area.

$$(d_{xB}, d_{yB}) = ((-(m-n)/m)d_x, (-(m-n)/m)d_y) \quad (1)$$

$$(d_{xF}, d_{yF}) = ((n/m)d_x, (n/m)d_y) \quad (2)$$

The subsequent processing is the same as in the first embodiment.

The predicted image generator 111 receives the motion information obtained by the motion modifier 810 together with the Wyner-Ziv frame and the preceding and following key frames (step S304), generates a predicted image (step S305), and supplies the predicted image to the required amount estimator 112 together with the original image of the Wyner-Ziv frame (step S306). The required amount estimator 112 compares the predicted image with the original image and estimates the amount of error-correcting information required to correct the prediction errors in each bit plane (step S307).

The original image of the Wyner-Ziv frame (the second frame) from the input sequence is input to the transform and quantization processor 107 (step S308). The transform and quantization processor 107 transforms the input image to the coefficient domain, quantizes the resulting coefficients, and divides the coefficient data into bit planes (step S309). A single bit plane is extracted and input to the Slepian-Wolf encoder 108 (step S310) for Slepian-Wolf encoding (step S311) to obtain error-correcting information. The estimate made by the required amount estimator 112 is also supplied to the Slepian-Wolf encoder 108 (step S312). The Slepian-Wolf encoder 108 sends the estimated amount of error-correcting information to the Wyner-Ziv frame decoder 105 (step S313). Steps S310, S311, S312, S313 are repeated for each of the bit planes (step S314).

The estimates of motion between key frames in the second embodiment are in general more accurate than the extrapolated or otherwise modified motion estimates used in the first embodiment, so the key frame encoding efficiency is improved. Predicted images for the Wyner-Ziv frame can be generated with less processing than in the first embodiment because the key frame motion information is used.

Third Embodiment

Figure 12:
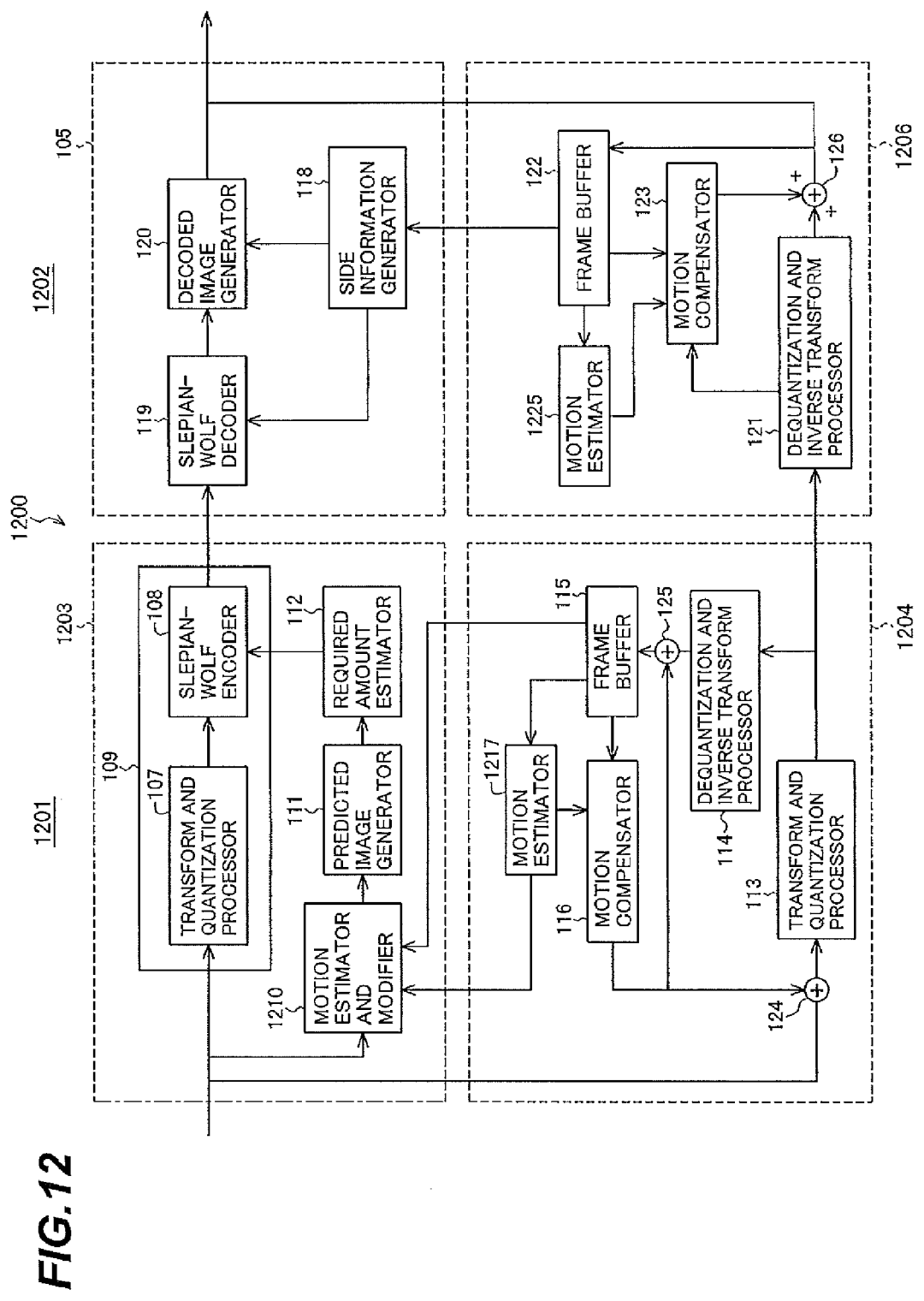

Referring to FIG. 12, the moving picture coding system 1200 in the third embodiment includes a moving picture encoding apparatus 1201 and a moving picture decoding apparatus 1202.

The moving picture encoding apparatus 1201 includes a Wyner-Ziv frame encoder 1203 and a key frame encoder 1204.

The Wyner-Ziv frame encoder 1203 includes a transform and quantization processor 107 and a Slepian-Wolf encoder 108, which together constitute a Wyner-Ziv frame encoding unit 109, and a motion estimator and modifier 1210, a predicted image generator 111, and a required amount estimator 112. The motion estimator and compensator 1210 functions as the second motion information generator. The elements other than the motion estimator and modifier 1210 are the same as in the first embodiment.

The key frame encoder 1204 includes a transform and quantization processor 113, a dequantization and inverse transform processor 114, a frame buffer 115, a motion compensator 116, a motion estimator 1217, a subtractor 124, and an adder 125. The elements other than the motion estimator 1217 are the same as in the first embodiment.

The moving picture decoding apparatus 1202 includes a Wyner-Ziv frame decoder 105 and a key frame decoder 1206. The Wyner-Ziv frame decoder 105 is the same as that in the first embodiment.

The key frame decoder 1206 includes a dequantization and inverse transform processor 121, a frame buffer 122, a motion compensator 123, an adder 126, and a motion estimator 1225, differing from the first embodiment only in the added presence of motion estimator 1225.

The third embodiment differs from the first embodiment in regard to the motion estimator and modifier 1210, and motion estimators 1217 and 1225.

The motion estimators 1217 and 1225 estimate key frame motion information from key frames that were encoded or decoded before the current key frame.

The motion estimator and modifier 1210 obtains motion information for a Wyner-Ziv frame either by modifying key frame motion information received from motion estimator 1217, or by receiving the Wyner-Ziv frame from the input sequence and receiving the preceding key frame, the following key frame, or the preceding and following key frames from frame buffer 115 and estimating motion directly from the frame data.

The operation of the moving picture coding system 1200 will be described with reference to the flowcharts in FIG. 12 and the flowcharts in FIGS. 13 to 16. It will again be assumed that the input sequence consists of odd-numbered key frames and even-numbered Wyner-Ziv frames. Interframe encoding of key frames starts after two key frames have been encoded. The first and third frames are therefore encoded by intraframe encoding, and the fifth frame and subsequent key frames are encoded by interframe encoding.

Intraframe encoding of key frames and the decoding of Wyner-Ziv frames are carried out in the same way as in the first embodiment. A repeated description will be omitted.

Figure 13:
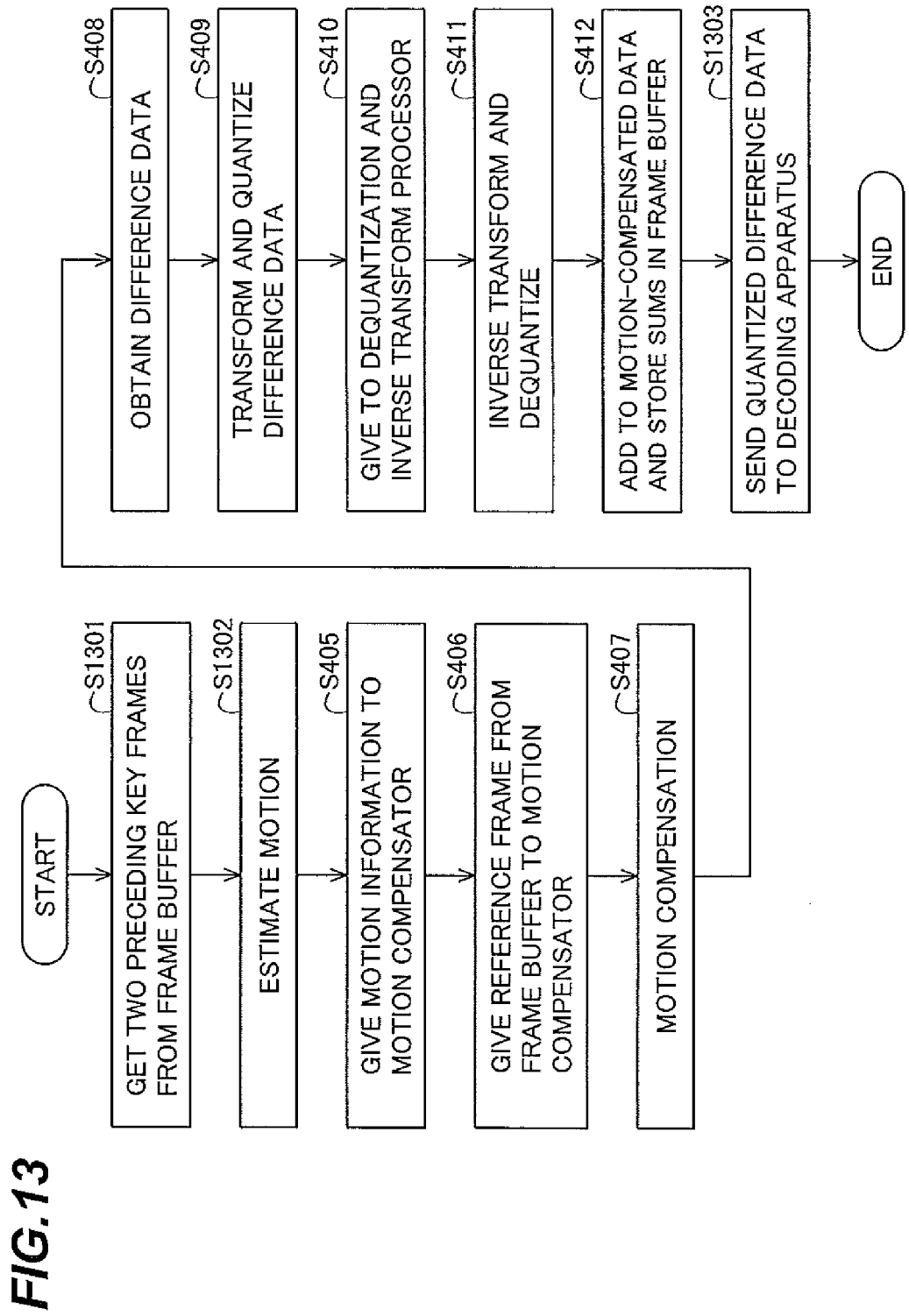
FIG. 13 is a flowchart illustrating the interframe encoding of key frames in the second embodiment.

Interframe encoding of the fifth frame will be described with reference to FIGS. 12 and 13.

The locally decoded images for the first and third frames are supplied from frame buffer 115 to the motion estimator 1217 (step S1301). The motion estimator 1217 uses these images to estimate motion from the third frame to the fifth frame (step S1302). A conventional estimation method, such as the method described by Liu et al. in Section 2.1, "Motion Estimation" of 'Backward Channel Aware Wyner-Ziv Video Coding', may be used.

The processing from step S405 to step S412 is substantially the same as in the first embodiment.

The key frame motion information is supplied from the motion estimator 1217 to the motion compensator 116 (step S405). The image data of the reference frame (in this case, the third frame) are supplied from frame buffer 115 to the motion compensator 116 (step S406). The motion compensator 116 uses the reference frame data and the motion information to perform motion compensation (step S407).

The difference between the result output from the motion compensator 116 and the original image of the fifth frame from the input sequence is input to the transform and quantization processor 113 (step S408). The transform and quantization processor 113 transforms and quantizes the difference (step S409) and supplies the resulting data to the dequantization and inverse transform processor 114 (step S410). The dequantization and inverse transform processor 114 performs inverse quantization and an inverse transform to obtain the locally decoded difference between the original image of the fifth frame and the result of motion compensation (step S411). The adder 125 adds the data output from the dequantization and inverse transform processor 114 and the motion compensator 116 to obtain a locally decoded image for the fifth frame, and this image is stored in frame buffer 115 (step S412). The quantized data output from the transform and quantization processor 113 are sent to the key frame decoder 106 (step S1303). Differing from the first embodiment, no motion information is sent to the key frame decoder 106.

Encoding of the second and fourth frames (Wyner-Ziv frames) will be described with reference to FIGS. 12, 14, and 15.

The original image of the Wyner-Ziv frame to be encoded is taken from the input sequence and input to the motion estimator and modifier 1210 (step S1401 in FIG. 14). The locally decoded images for the key frames preceding and following the Wyner-Ziv frame are supplied from frame buffer 115 to the motion estimator and modifier 1210 (step S1402). Whether information about motion between the preceding and following key frames is available from the motion estimator 1217 is determined (step S1403).

If such motion information is available, the motion estimator 1217 supplies the key frame motion information to the motion estimator and modifier 1210 (step S1404), and the motion estimator and modifier 1210 obtains the motion information for the Wyner-Ziv frame by interpolation as described in the second embodiment (FIG. 11), for example (step S1405). When the fourth frame is encoded, motion information is obtained in this way.

If key frame motion information is not available, the motion estimator and modifier 1210 uses the input Wyner-Ziv frame and the preceding and following key frames to perform motion estimation as in the first embodiment (step S1406). When the second frame is encoded, motion information is obtained in this way because the preceding and following key frames (the first and third frames) were both encoded by intraframe encoding and the motion between them has not been estimated. The motion estimator and modifier 1210 may use any known motion estimation method. A motion estimation method that uses a small search area to reduce the processing load may be used, for example, as described by Brites et al. in Section 3.1.2, "Fast Motion Compensated Interpolation (FMCI)" of 'Encoder Rate Control for Transform Domain Wyner-Ziv Video Coding'.

The subsequent processing is the same as in the first embodiment. Following step 1405 or step S1406, the motion information obtained by the motion estimator and modifier 1210 is input to the predicted image generator 111 together with the image data of the preceding and following key frames and the Wyner-Ziv frame being encoded (step S304). The predicted image generator 111 uses the input motion information and key frame image data to generate a predicted image (step S305 in FIG. 15) and supplies the predicted image to the required amount estimator 112 together with the original image of the Wyner-Ziv frame (step S306). The required amount estimator 112 compares the original and predicted images and estimates the amount of error-correcting information required to correct prediction errors in each bit plane (step S307).

The original image data of the Wyner-Ziv frame from the input sequence are input to the transform and quantization processor 107 (step S308). The transform and quantization processor 107 transforms the data to the coefficient domain, quantizes the transformed data, and divides the quantized data into bit planes (step S309), one of which is input to the Slepian-Wolf encoder 108 (step S310). After Slepian-Wolf encoding of the input bit plane (step S311), the estimate made by the required amount estimator 112 is input to the Slepian-Wolf encoder 108 (step S312), which sends the estimated amount of error-correcting information to the Wyner-Ziv frame decoder 105 (step S313). Steps S310, S311, S312, and S313 are repeated for each of the bit planes (step S314).

Intraframe decoding of encoded key frames, such as the first and third frames, is the same as in the first embodiment. Interframe decoding of the fifth frame will be described with reference to FIGS. 12 and 16.

The decoded images of the first and third frames are supplied from frame buffer 122 to motion estimator 1225 (step S1601). Motion estimator 1225 estimates motion between the third and fifth frames (step S1602), using the same method as used by motion estimator 1217 in the key frame encoder 1204.

After this motion estimation process the subsequent steps are substantially the same as in the first embodiment.

The encoded fifth frame data are received from the key frame encoder 1204 and input to the dequantization and inverse transform processor 121 (step S701). The dequantization and inverse transform processor 121 performs inverse quantization and an inverse transform to obtain difference image data for the fifth frame (step S702).

The motion compensator 123 receives the motion information estimated by motion estimator 1225 (step S703), instead of receiving motion information from the key frame encoder as in the preceding embodiments. The motion compensator 123 also receives reference frame data, in this case the decoded image data for the third frame, from frame buffer 122 (step S704). The motion compensator 123 uses the reference frame data and the motion information to perform motion compensation (step S705).

The adder 126 adds the motion-compensated image data output from the motion compensator 123 and the difference image data information output from the dequantization and inverse transform processor 121 to obtain a decoded image for the key frame (step S706). The decoded image is stored in frame buffer 122 so that it can be used as reference frame data for interframe decoding of the next key frame, and in generation of predicted images for Wyner-Ziv frames (step S707). The decoded image is also output to a next-stage unit, which is not shown (step S708).

Since the key frame encoder and the key frame decoder estimate key frame motion independently, the need to send motion information from the key frame encoder to the key frame decoder is eliminated, and the key frame encoding efficiency is improved accordingly.

The following variations are also possible.

The channel between the video encoder and the video decoder is not limited to a channel in a narrow sense of realtime communication. The channel may include a recording medium on which the data encoded by the moving picture encoding apparatus are stored for later decoding by the moving picture decoding apparatus.

The key frames used in the generation of predicted images are not limited to the immediately preceding and following key frames. For example, two key frames preceding and two key frames following each Wyner-Ziv frame may be used. In that case, a correspondingly larger amount of motion information must be generated.

When the motion estimator 110 or the motion estimator and modifier 1210 in the Wyner-Ziv frame encoder estimates the motion of a Wyner-Ziv frame directly from frame data, it may use the frame data of the Wyner-Ziv frame and either the preceding or following key frame, or the frame data of the Wyner-Ziv frame and both the preceding and following key frames.

When motion modifier 117 or the motion estimator 817 or 1217 in the key frame encoder refers to key frame data to estimate motion or modify motion information, it may obtain all the key frame data from the input sequence, or obtain all the key frame data from the frame buffer, instead of obtaining some key frame from the input sequence and other key frame data from the frame buffer.

Although a transform such as a DCT is carried out in the description given above, the processing may be performed in the pixel domain instead.

The quantized key frame data may be further encoded by entropy coding, for example, to improve the compression ratio before being sent to the decoding apparatus.

The input of moving picture sequence need not consist of alternate key frames and Wyner-Ziv frames. The sequence may be divided into key frames and Wyner-Ziv frames in any ratio. For example, two consecutive key frames may be followed by a single Wyner-Ziv frame, so that the ratio of key frames to Wyner-Ziv frames is 2:1. In that case, the uneven temporal spacing between key frames must be taken into account when motion information is generated by interpolation or extrapolation.

Those skilled in the art will recognize that further variations are possible within the scope of the invention, which is defined in the appended claims.

What is claimed is:

1. An encoding apparatus for encoding, by distributed video coding, a sequence of moving-picture frames that has been divided into a sequence of key frames and a sequence of non-key frames, the encoding apparatus comprising:
   a key frame encoder for encoding the key frames to generate coded data; and
   a non-key frame encoder for encoding the non-key frames to generate error-correcting information,
   wherein the key frame encoder comprises
      a first key frame buffer for storing key frame data,
      a first motion information generator for obtaining first motion information representing first motion pertaining to the key frames, and
      a first motion compensator for applying the first motion information to the key frame data stored in the first key frame buffer to generate first predicted key frame data,
   wherein the non-key frame encoder comprises
      a second motion information generator for obtaining second motion information pertaining to the non-key frames, and
      a predicted image generator for using the second motion information to generate predicted non-key frame data,
   wherein information representing the first motion is generated in the key frame encoder and supplied to the second motion information generator,
   wherein the second motion information is generated in the non-key frame encoder and supplied to the first motion information generator,
   wherein the first motion information generator generates the first motion information by extrapolation from the second motion information supplied from the non-key frame encoder,
   wherein the second motion information generator receives, as the information representing the first motion, the key frame data from the first key frame buffer, and generates the second motion information based on the received key frame data, wherein the key frame encoder performs intraframe and interframe encoding of the key frames, and further comprises:

a subtractor that
in the interframe encoding, takes a difference between a current key frame data in the sequence of key frames and the first predicted key frame data output from the first motion compensator, and
in the intraframe encoding, outputs the current key frame data in the sequence of key frames, a transform and quantization processor that transforms the output of the subtractor to a coefficient domain by a discrete cosine transform to produce the coded data, a dequantization and inverse transform processor that performs a dequantization process and an inverse transform on the coded data output from the transform and quantization processor, to produce locally decoded data, and an adder that
in the interframe encoding, adds the first predicted key frame data output from the first motion compensator, to the locally decoded data output from the dequantization and inverse transform processor, and
in the intraframe encoding, outputs the locally decoded data output from the dequantization and inverse transform processor, and wherein the first key frame buffer stores the output of the adder as the key frame data.

2. The encoding apparatus of claim 1, wherein:

the key frame encoder obtains the coded data representing some of the key frames by encoding differences between the key frames and the first predicted key frame data;

the key frame encoder obtains the key frame data stored in the first key frame buffer by locally decoding the coded data;

the non-key frame encoder obtains the error-correcting information representing the non-key frames by encoding the non-key frames; and the non-key frame encoder further comprises an amount estimator that uses the predicted non-key frame data to decide how much of the error-correcting information to output from the non-key frame encoder.

3. A system for encoding and decoding a sequence of moving-picture frames that has been divided into a sequence of key frames and a sequence of non-key frames, the system comprising:

the encoding apparatus of claim 1, and a decoding apparatus, including
a key frame decoder for decoding the decoded data to obtain decoded key frame data and generating second predicted non-key frame data from the decoded key frame data; and a non-key frame decoder for receiving the error-correcting information output from the encoding apparatus and applying the error-correcting information to the second predicted non-key frame data to generate decoded non-key frame data.

4. The system of claim 3, wherein the key frame decoder further comprises:

a second key frame buffer for storing the decoded key frame data; and a second motion compensator for receiving the first motion information from the first motion information generator and applying the first motion information to the decoded key frame data stored in the second key frame buffer to generate the second predicted non-key frame data.

5. The encoding apparatus of claim 1, wherein the encoding apparatus does not receive feedback from a decoding apparatus.

6. The encoding apparatus of claim 1, wherein the second motion information generator further receives current non-key frame data from the sequence of the non-key frames, the key frame data include key frame data following and preceding the current non-key frame data obtained from the sequence of the key frames, the second motion information generator further receives, as the information representing the first motion, the key frame data preceding the current non-key frame data, from the first key frame buffer, the second motion information generator performs motion estimation from the current non-key frame data, the key frame data preceding the current non-key frame data and the key frame data following the current non-key frame data, and the second motion information generated by the second motion information generator represents a motion between the current non-key frame data and the key frame data following the current non-key frame data.

7. The encoding apparatus of claim 6, wherein the first motion information generator receives the current key frame data obtained from the sequence of the key frames, the key frame data further include key frame data following and preceding the current key frame data obtained from the sequence of the key frames, the first motion information generator further receives the key frame data preceding the current key frame data from the first key frame buffer, and the first motion information generated by the first motion information generator represents a motion between the current key frame data and the key frame data preceding the current key frame data.

* * * * *